(12) United States Patent
Barber et al.

(10) Patent No.: US 8,291,055 B1
(45) Date of Patent: Oct. 16, 2012

(54) METHOD AND APPARATUS FOR MONITORING MESSAGE ACTIVITY

(75) Inventors: Peter Barber, Surrey (GB); Richard Glanville, Berkshire (GB)

(73) Assignee: Symantec Corporation, Mountain View, CA (US)

(*) Notice: Subject to any disclaimer, the term of this patent is extended or adjusted under 35 U.S.C. 154(b) by 714 days.

(21) Appl. No.: 11/864,443

(22) Filed: Sep. 28, 2007

(51) Int. Cl.
*G06F 15/16* (2006.01)
*G06F 15/173* (2006.01)

(52) U.S. Cl. ......... 709/223; 709/224; 709/204; 709/206

(58) Field of Classification Search ............... 709/224
See application file for complete search history.

(56) References Cited

U.S. PATENT DOCUMENTS

| | | | | |
|---|---|---|---|---|
| 6,941,304 | B2* | 9/2005 | Gainey et al. | 707/10 |
| 7,685,639 | B1* | 3/2010 | McCorkendale et al. | 726/24 |
| 2003/0182383 | A1* | 9/2003 | He | 709/206 |
| 2003/0208608 | A1* | 11/2003 | Merriam | 709/229 |
| 2004/0162913 | A1* | 8/2004 | Halahmi et al. | 709/236 |
| 2005/0047557 | A1* | 3/2005 | Sankaramanchi | 379/88.12 |
| 2006/0123226 | A1* | 6/2006 | Kumar et al. | 713/154 |
| 2006/0149823 | A1* | 7/2006 | Owen et al. | 709/206 |
| 2007/0005715 | A1* | 1/2007 | LeVasseur et al. | 709/206 |
| 2007/0073808 | A1* | 3/2007 | Berrey et al. | 709/204 |
| 2007/0156825 | A1* | 7/2007 | McCarthy et al. | 709/206 |
| 2007/0168435 | A1* | 7/2007 | Moraca et al. | 709/206 |

OTHER PUBLICATIONS

"Electronic Message Archiving—Postini's Managed Service Approach to Archiving," downloaded from web site http://www.postini.com/whitepapers/WP37-01-0512_ArchiveManager.pdf, published Jan. 24, 2006.
"Google Message Consolidation," downloaded from web site http://www.postini.com/whitepapers/message_consolidation.pdf, Copyright 2008.
"Google Message Discovery," downloaded from web site http://www.postini.com/whitepapers/message_discovery.pdf, Copyright 2008.
"Email Archiving," downloaded on Feb. 10, 2008 from web site http://www.inboxer.com/email-archiving.shtml.
"Electronic Discovery," downloaded on Feb. 10, 2008 from web site http://www.inboxer.com/electronic-discovery.shtml.

* cited by examiner

*Primary Examiner* — Kevin Bates
*Assistant Examiner* — Mohammed Ahmed
(74) *Attorney, Agent, or Firm* — Campbell Stephenson LLP

(57) ABSTRACT

A method and apparatus for monitoring message activity comprising processing message activity from a message generator, recording the message activity and coupling the message activity with message information stored within a message distributor and store is described.

14 Claims, 4 Drawing Sheets

METHOD AND APPARATUS FOR MONITORING MESSAGE ACTIVITY

BACKGROUND OF THE INVENTION

1. Field of the Invention

Embodiments of the present invention generally relate to electronic communication technology and, more particularly, to a method and apparatus for monitoring electronic mail message activity.

2. Description of the Related Art

Electronic mail (e-mail) archiving is a systematic approach to saving and protecting the data contained in e-mail messages so it can be accessed reliably and quickly at a later date. Because of compliance laws, government regulations and legal discovery rules, it has become necessary for many organizations to archive e-mail messages so specific ones can be located and retrieved easily. An e-mail message archiving software manages large e-mail archives and also helps in reducing the cost to store the archived e-mail messages. Typical e-mail message archiving software also provides indexing and search capabilities.

Typical e-mail systems comprise a user computer having e-mail software (e.g., MICROSOFT OUTLOOK), which communicates with an e-mail server (e.g., MICROSOFT EXCHANGE SERVER, LOTUS DOMINO SERVER, POP 3 SERVER and the like). Current archiving software programs periodically examine and archive every e-mail message stored in each mailbox located within the e-mail server. Further, the archived messages are stored in a separate storage container. Because the messages are archived periodically, in some instances, an e-mail message may be created, sent and deleted between archival periods. Accordingly, there is no way of verifying that the e-mail message was successfully received by the e-mail server from the e-mail software. In addition, the e-mail server occasionally drops or destroys the e-mail message. For example, a bug in the e-mail software code may cause a failure that results in the loss of one or more e-mail messages.

For compliance reasons, there is a need to provide end-to-end validation for every e-mail message related to the organization. End-to-end validation includes confirmation that an e-mail message was created, sent, received at a mail server and subsequently archived, such that every step in the message archiving process is verified.

Accordingly, there exists a need for method and apparatus that can monitor e-mail message activity. Further, there exists a need for method and apparatus that can enable end-to-end validation.

SUMMARY OF THE INVENTION

Embodiments of the present invention, generally, comprise a method and apparatus for monitoring message activity. In one embodiment, the method and apparatus comprises processing message activity from a message generator, recording the message activity and coupling the message activity with message information stored within a message distributor and store.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the word "a" means "at least one", and the word "plurality" means one or more, unless otherwise mentioned.

DETAILED DESCRIPTION

Figure 1:
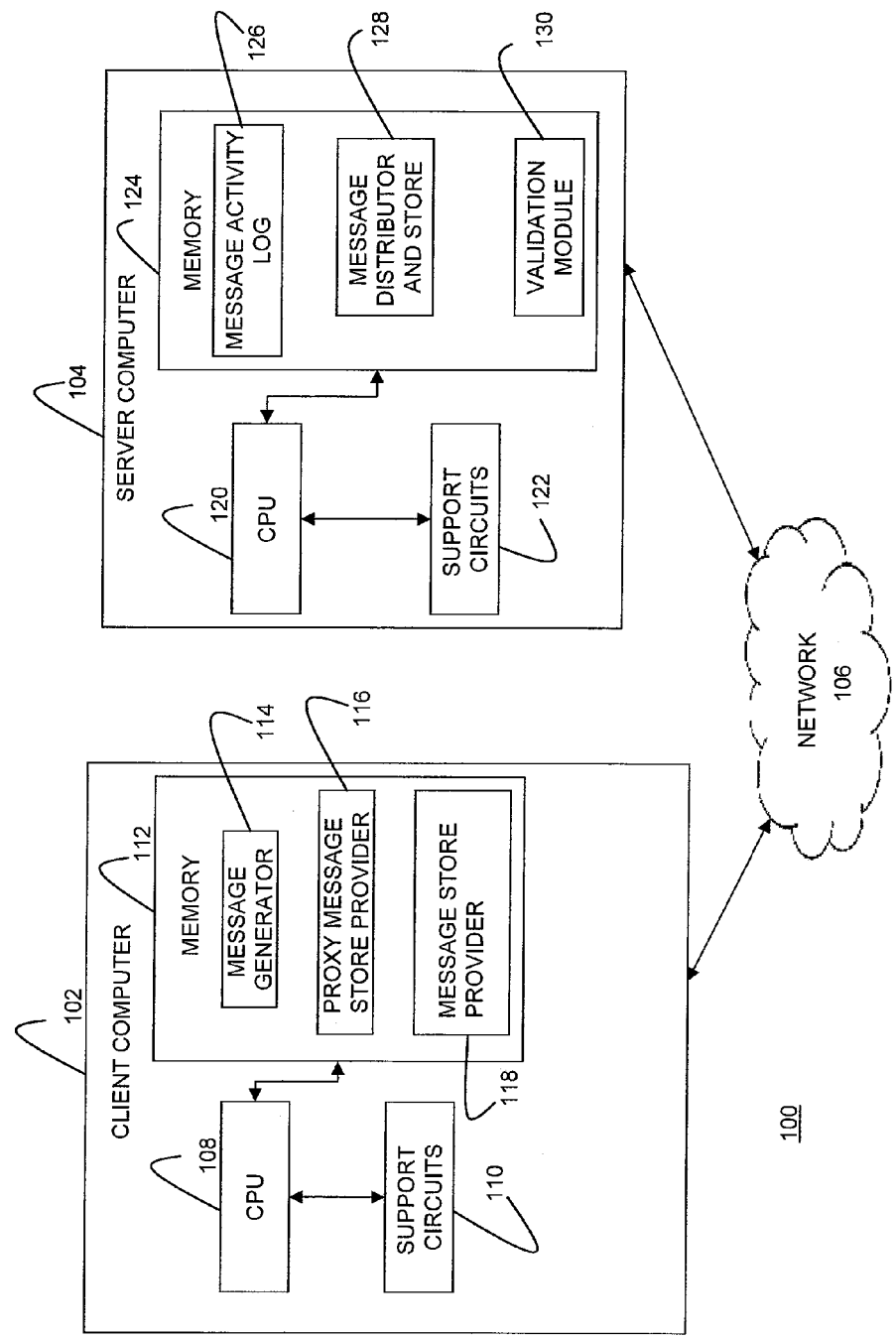
FIG. 1 is a block diagram illustrating a system for monitoring message activity according one embodiment of the present invention.

FIG. 1 is a block diagram illustrating a system 100 for monitoring message activity according various embodiments of the present invention. The system 100 comprises a client computer 102 and a server computer 104, each coupled to a network 106. The network 106 may be a Local Area Network (LAN), Wide Area Network (WAN) or any such network known in the art. The client computer 102 and the server 104 communicate through the network 106.

The client computer 102 includes a CPU 108, various support circuits 110 and a memory 112. The CPU 108 may comprise a microprocessor, instruction-set processor, a microcontroller or similar processing element known in the art. Various support circuits 110 may include power supplies, clock circuits, data registers, I/O circuitry and the like to facilitate operation of the CPU 110. The memory 112 may be random access memory, read only memory (e.g., PROM, EPROM, EEPROM and the like), removable storage (e.g., optical disk, tape drive and the like), hard disk storage, flash drives or any combination thereof. Various support circuits 110 and the memory 112 are coupled to the CPU 108. The memory 112 includes a message generator 114, a proxy message store provider 116 and a message store provider 118.

The server 104 includes a CPU 120, various support circuits 122 and a memory 124. The CPU 120 may comprise a microprocessor, instruction-set processor, a microcontroller or similar processing element known in the art. Various support circuits 122 may include power supplies, clock circuits, data registers, I/O circuitry and the like to facilitate operation of the CPU 120. The memory 124 may be random access memory, read only memory (e.g., PROM, EPROM, EEPROM and the like), removable storage (e.g., an optical disk, a tape drive and the like), hard disk storage, flash drives or any combination thereof. Various support circuits 122 and the memory 124 are coupled to the CPU 120. The memory 124 includes a message activity log 126 and a message distributor and store 128 and a validation module 130.

The message generator 114 is stored and executed by the client computer 102. The message generator 114 may be messaging software (e.g., MICROSOFT OUTLOOK) for initiating message activity. In one embodiment, the message activity may be characterized by function calls (e.g., send message, create message, store message and the like). When a message is created by the user, the message generator 114 saves the message in an underlying message store, as described below.

According to one or more embodiments, the message distributor and store 128 may be an e-mail server (e.g., MICROSOFT EXCHANGE SERVER) configured to manage an underlying message storage mechanism for various members of an organization. For example, the message distributor and store 128 transfers a message to an appropriate portion of a message store (e.g., a mailbox). In another embodiment, the message distributor and store 128 receives and distributes the message to an intended recipient (e.g., a mailbox associated with the intended recipient).

The proxy message store provider 116 is a service provider in accordance with the Message Application Programming Interface (MAPI) architecture. Service providers, generally, enable the communication of messages from the message generator 114 to an underlying message store (e.g., a message store portion of the message distributor and store 128) and/or the message distributor and store 128. As such, the proxy message store provider 116 is able to operate with the message generator 114 as a type of service provider (i.e. a message store provider). Specifically, the proxy message store provider 116 implements a message store provider interface within the MAPI architecture.

Similarly, the message store provider 118 is also a service provider (i.e. an implementation of the message store provider interface). Message store providers, generally, handle the storage and retrieval of messages and related information from the underlying message store for the message generator 114. The underlying message store may be a hierarchical message storage mechanism underneath the service providers in the MAPI architecture. The message store provider 118 is utilized by the message generator 114 to store the messages in an underlying message store such as a PST file (i.e., Personal Folder File) or a message store located within an Exchange Server (e.g., the message distributor and store 128) along with information related to the messages (e.g., a read receipt request, a follow up flag, a rule and the like). In one embodiment, the message store provider 118 is an Exchange Message Store Provider configured to operate between MICROSOFT OUTLOOK and MICROSOFT EXCHANGE SERVER.

According to one or more embodiments, the proxy message store provider 116 wraps the message store provider 118. Generally, when a first message store provider is wrapped by a second message store provider, a function call on the first message store provider is initially received by the second message store provider. The second message store provider may modify, redirect and/or record the function call. The second message store provider may also allow the function call to pass through to the first message store provider unaltered.

In one embodiment, the message generator 114 communicates a message activity to the proxy message store provider 116, which records the message activity upon receipt and communicates or redirects the message activity to the message store provider 118. In another embodiment, the proxy message store provider 116 intercepts the message activity and allows the message activity to pass through to the message store provider 118 such that an operation associated with the message activity is performed as originally intended. In yet another embodiment, the message activity is communicated to the validation module 130 at or around the same time that the message activity is communicated or allowed to pass through to the message store provider 118.

According to one embodiment, the validation module 130 receives the message activity from the proxy message store provider 116. The validation module 130 records the message activity in the message activity log 126, which may be a database that stores the recorded message activity for a pre-determined period of time. As described below, the validation module 130 provides receipt confirmation for the messages stored in the message distributor and store 128 using the message activity log 126.

In operation, the message generator 114 via the proxy message store provider 116 instructs the message store provider 118 to store a message created by the user in an appropriate underlying message store and then, communicate the created message to the message distributor and store 128. In one embodiment, the message store provider 118 communicates the message to another service provider for performing various tasks (e.g., transmission to the server computer 104, preprocessing and the like). The instructions from the message generator 114 may include calls to relevant functions defined by various service provider interfaces (e.g., create and store message, send or transmit message to the message distributor and store 128 for delivery to the intended recipient).

If receipt of the message by the message distributor and store 128 is confirmed, the message activity associated with the message is removed from the message activity log 126. In one embodiment, the message activity in the message activity log 126 is reported (e.g., a notification sent to a system administrator) after a pre-determined period of time elapses without a verification of the receipt of the message.

The validation module 130 cooperates with the message activity log 126 to enable end-to-end validation of one or more messages. In one embodiment, the validation module compares the message activity log 126 to a plurality of messages stored in the message distributor and store 128. Accordingly, discrepancies between the plurality of messages and the message activity log 126 may indicate that a message was created and sent by the message generator 114 but never received at the message distributor and store 128 and/or that the message was destroyed or dropped by the server computer 104. In one embodiment, the validation module compares each message activity in the message activity log 126 with each message stored in the message distributor and store 128. The presence of a message stored in the message distributor and store 128 that corresponds to a message activity in the message activity log confirms that the message was sent to the message distributor and store 128 from the client computer 102. The absence of such a corresponding message indicates that the message associated with the message activity failed to reach the message distributor and store 128 or was mistakenly destroyed or dropped by the server computer 104.

Optionally, an archival process is performed on the plurality of messages within the message distributor and store 128. The validation module 130 compares each message activity in the message activity log 126 to the plurality of archived messages. Accordingly, discrepancies between the message activity log 126 and the plurality of archived messages indicate that a message was sent but never received and/or stored at the message distributor and store 128. Furthermore, a match between a message activity and any of the plurality of archived messages confirms that the archived message was received by the message distributor and store 128 and subsequently archived during the archival process. Hence, end-to-end validation has been performed on the plurality of archived messages.

Figure 2:
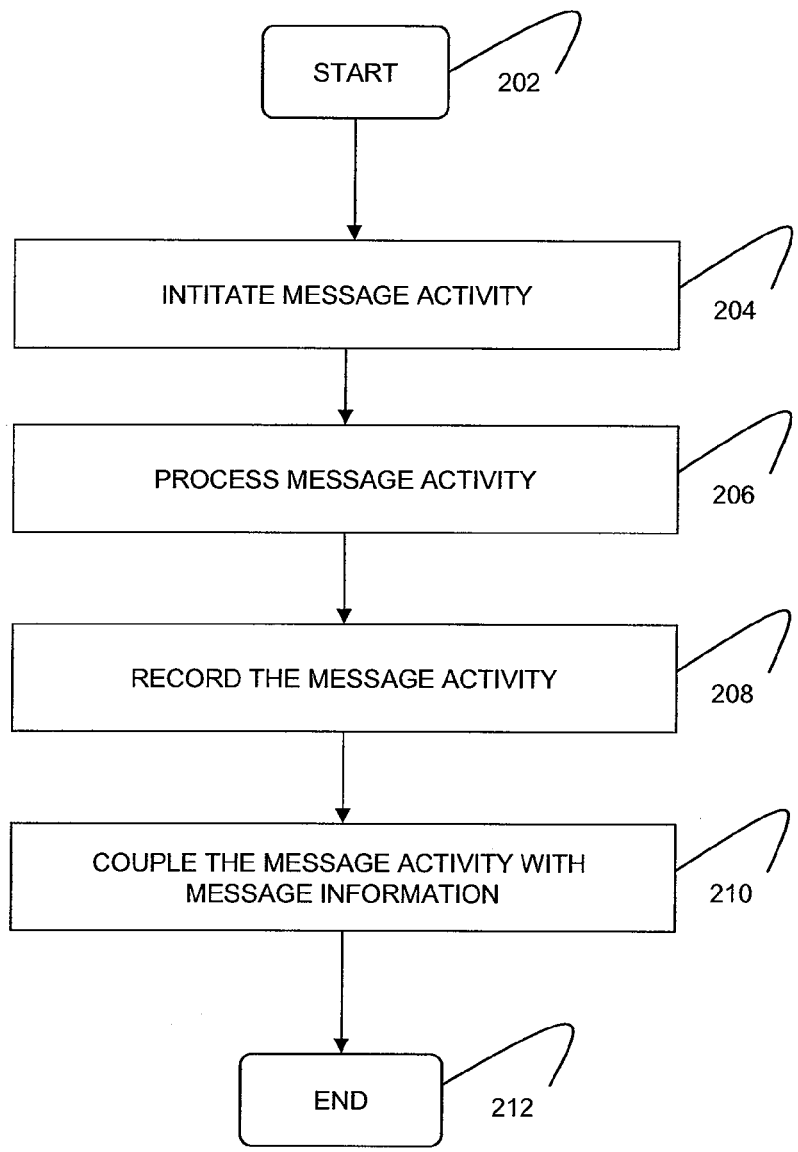
FIG. 2 is a flow diagram illustrating a method for monitoring message activity according to one embodiment of the present invention.

FIG. 2 is a flow diagram illustrating a method 200 for monitoring message activity according to various embodiments of the present invention. The method 200 starts at step 202 and proceeds to step 204 where a message generator initiates message activity. The message activity may be characterized by various function calls on a service provider interface built on the MAPI architecture such as a message store provider interface (e.g., create message, submit message and the like).

At step 206, the message activity is processed by a proxy message store provider. In one embodiment, the proxy message store provider communicates the message activity to a message store provider. In another embodiment, the proxy message store provider wraps the message store provider such that the message activity is processed between an operation performed by the message generator (e.g., send a message) and an operation performed by the message store provider (e.g., submit message to a message distributor, communicate message to another service provider and the like). In one embodiment, the message activity is communicated by the proxy message store provider to a validation module (e.g., the validation module 130) for receipt confirmation (e.g., validation).

At step 208, the message activity is recorded. In one embodiment, the message activity is recorded in a message activity log. At step 210, the message activity is coupled with message information (e.g., a plurality of message organized in a hierarchical message storage mechanism) stored within the message distributor and store to enable receipt confirmation. The message information may also include parameters, for example, a preparation time (e.g., time at which the message is created, a sent message time, contents of the message and the like). At step 212, the method 200 ends.

Figure 3:
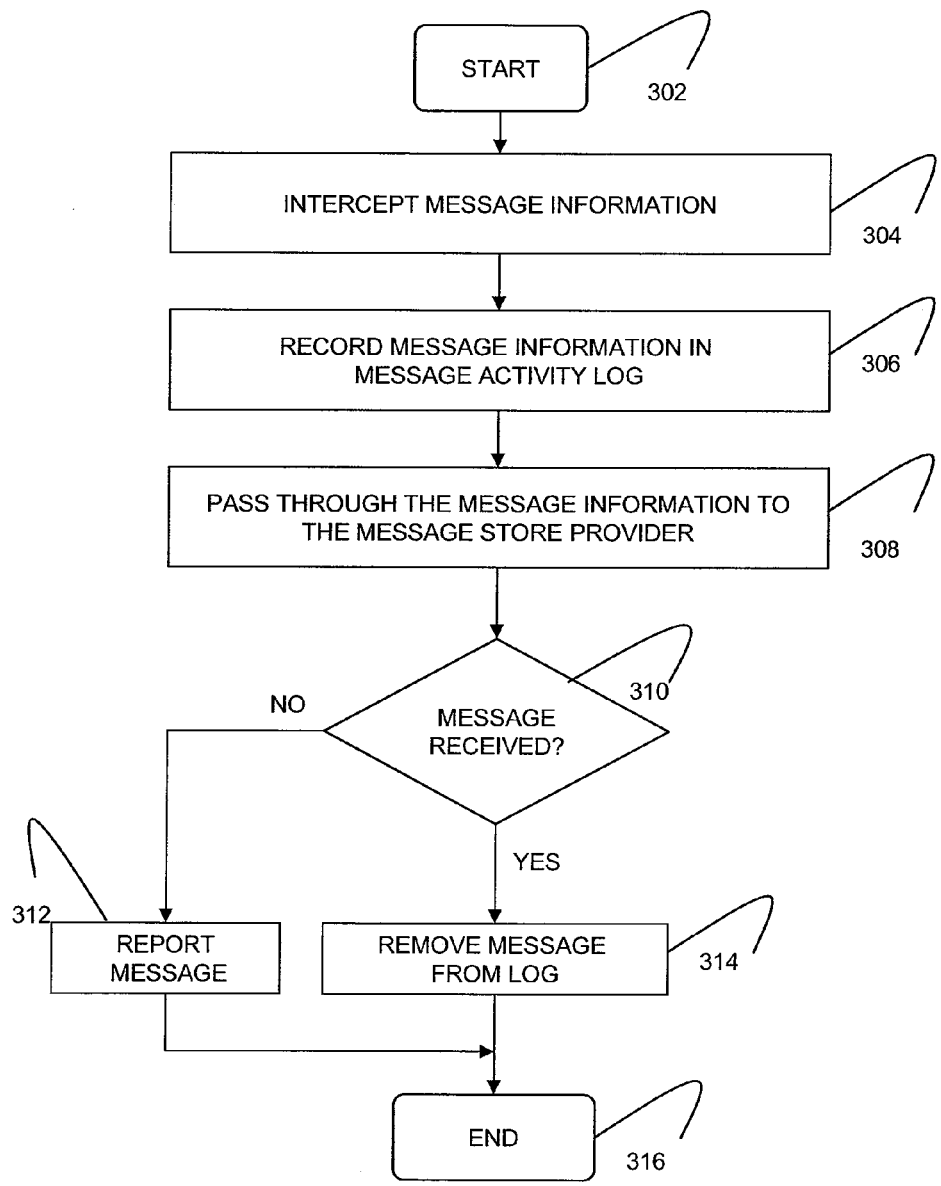
FIG. 3 is a flow diagram illustrating a method for communicating message activity to a message distributor according to one embodiment of the present invention.

FIG. 3 is a flow diagram illustrating a method 300 for communicating message activity to a message distributor according to another embodiment of the present invention. The method 300 starts at step 302 and proceeds to step 304. At step 304, a proxy message store provider intercepts message information being sent to a message distributor and store via a message store provider (e.g., a message store provider 118). At step 306, message activity associated with the message information is recorded in a message activity log. In one embodiment, the message information is communicated to a validation module (e.g., the validation module 130) for recordation in the message activity log. At step 308, the message information passes through to the message store provider. The message store provider sends the message information to the message distributor and store. At step 310, a determination is made as to whether the message information has been received by the message distributor and store (e.g., stored in the message distributor and store 128 of the server computer 104). If the message information has been received by the message distributor and store (option "YES"), the message activity is removed from the message activity log at step 314. If the message information has not been received by the message distributor and store and a sufficient period of time has elapsed (option "NO"), the method 300 proceeds to step 312 where the message information is reported. At step 316, the method 300 ends.

Figure 4:
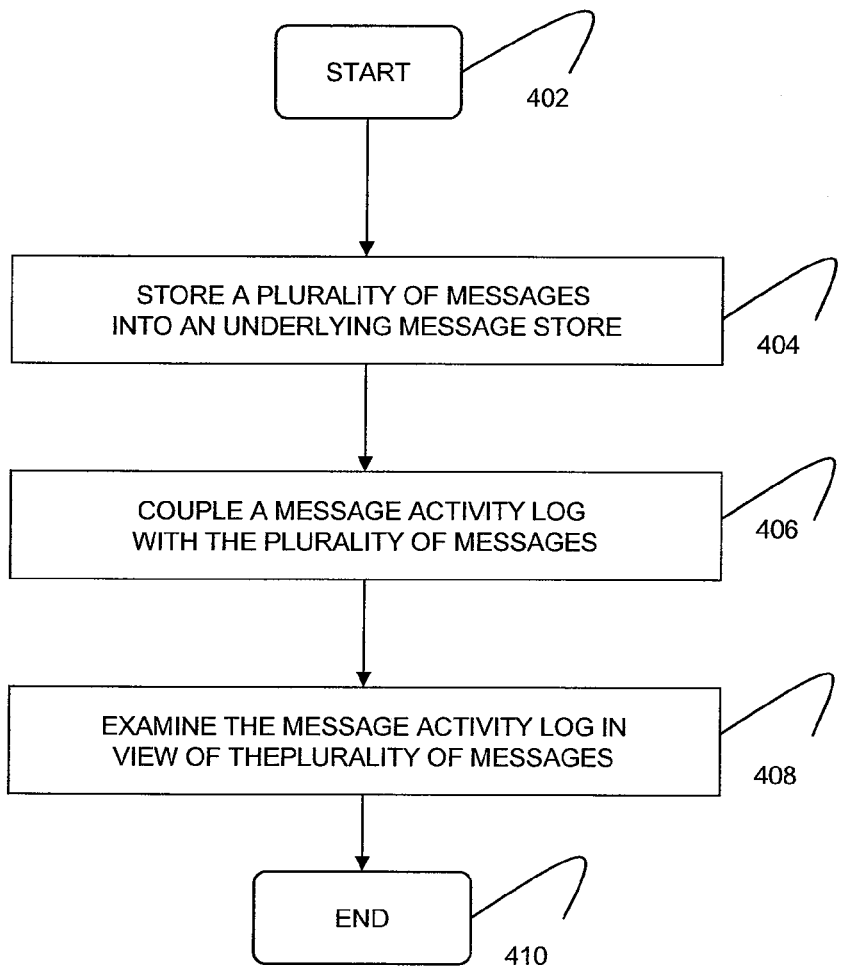
FIG. 4 is a flow diagram illustrating a method for determining discrepancies between a message activity log and a plurality of messages stored in a underlying message store according to one embodiment of the present invention.

FIG. 4 is a flow diagram illustrating a method 400 for determining a discrepancy between a message activity log and a plurality of messages stored at an underlying message store, according to one embodiment. The method 400 starts at step 402 and proceeds to step 404. In one embodiment, message activities are recorded in the message activity log in accordance with one or more embodiments of the present invention. At step 404, the plurality of messages is received and stored within the underlying message store (e.g., the message distributor and store 128). At step 406, the plurality of messages is coupled with the message activity log. At step 408, the message activity log is examined in view of the plurality of messages in order to determine any discrepancies. In one embodiment, each message activity within the message activity log is compared with the plurality of messages stored within the underlying message store. The method 400 ends at step 410.

While various embodiments may be discussed with reference to specific software environments, for example, software environments using Microsoft Software products such as Microsoft Outlook, Microsoft Exchange Server, Microsoft Exchange Client, and the like, those skilled in the art will appreciate that the techniques described herein are readily applicable to other software environments, and all such techniques are included within the scope and spirit of the present invention.

While the foregoing is directed to embodiments of the present invention, other and further embodiments of the invention may be devised without departing from the basic scope thereof, and the scope thereof is determined by the claims that follow.

The invention claimed is:

1. A method of monitoring message activity, comprising:
identifying the message activity, using a processor;
recording the message activity in a message activity log, using the processor;
receiving the message activity at a server;
determining whether a message corresponding with the message activity has been received at the server;
determining whether to validate the message by comparing the message activity recorded in the message activity log with each of a plurality of messages stored at the server;
removing the message activity from the message activity log, if receipt of the message by the server is confirmed; and
reporting the message activity, if receipt of the message is not confirmed after a period of time elapses.

2. The method of claim 1, further comprising:
communicating the message to the server.

3. The method of claim 2, further comprising:
confirming receipt of the message by the server.

4. The method of claim 2, further comprising:
determining that the message is not within the server.

5. The method of claim 1, further comprising:
identifying a discrepancy between the message activity log and the plurality of messages stored at the server.

6. The method of claim 1, further comprising:
validating the message.

7. The method of claim 1, further comprising:
archiving the message at the server; and
validating the message.

8. A non-transitory computer readable storage medium comprising instructions executable to:
identify message activity;

record the message activity in a message activity log;
receive the message activity at a server;
determine whether a message corresponding with the message activity has been received at the server;
determine whether to validate the message by comparing the message activity recorded in the message activity log with each of a plurality of messages stored at the server;
remove the message activity from the message activity log, if receipt of the message by the server is confirmed; and
report the message activity, if receipt of the message is not confirmed after a period of time elapses.

9. The non-transitory computer readable storage medium of claim 8, wherein the program instructions are further executable to:
identify a discrepancy between the message activity log and the plurality of messages stored at the server.

10. The non-transitory computer readable storage medium of claim 8, wherein the program instructions are further executable to:
confirm receipt of the message by the server.

11. The non-transitory computer readable storage medium of claim 8, wherein the program instructions are further executable to:
determine that the message is not within the server.

12. A system for monitoring message activity, comprising:
one or more processors;
memory coupled to the one or more processors, wherein the memory stores program instructions executable by the one or more processors to:
identify the message activity;
record the message activity in a message activity log;
receive the message activity at a server;
determine whether a message corresponding with the message activity has been received at the server;
determine whether to validate the message by comparing the message activity recorded in the message activity log with each of a plurality of messages stored at the server;
remove the message activity from the message activity log, if receipt of the message by the server is confirmed; and
report the message activity, if receipt of the message is not confirmed after a period of time elapses.

13. The system of claim 12, wherein the program instructions are further executable to:
communicate the message to the server.

14. The system of claim 12, wherein the program instructions are further executable to:
identify a discrepancy between the message activity log and the plurality of messages stored at the server.

* * * * *